United States Patent
Holland et al.

(10) Patent No.: US 8,308,609 B2
(45) Date of Patent: Nov. 13, 2012

(54) POWER-OFF DOWNSHIFT ENGAGEMENT DAMPENING

(75) Inventors: Shawn A. Holland, Livonia, MI (US);
Ralph S. Walker, Livonia, MI (US);
George Herr, Canton, MI (US); Jeffrey J. Tumavitch, Livonia, MI (US);
Bradley D. Riedle, Northville, MI (US);
Steven C. Meisner, Dexter, MI (US);
Hong Jiang, Canton, MI (US); Matthew J. Shelton, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 379 days.

(21) Appl. No.: 12/814,550

(22) Filed: Jun. 14, 2010

(65) Prior Publication Data

US 2011/0306464 A1    Dec. 15, 2011

(51) Int. Cl.
*B60W 10/02*    (2006.01)
*B60W 10/06*    (2006.01)
*B60W 10/10*    (2012.01)

(52) U.S. Cl. ........................................... 477/77

(58) Field of Classification Search ............... 477/77
See application file for complete search history.

(56) References Cited

U.S. PATENT DOCUMENTS

| | | | |
|---|---|---|---|
| 5,915,512 A | 6/1999 | Adamis et al. | |
| 6,684,148 B2 | 1/2004 | Chess | |
| 6,832,978 B2 | 12/2004 | Buchanan et al. | |
| 7,089,102 B2 * | 8/2006 | Slayton et al. | 701/51 |
| 7,123,998 B2 | 10/2006 | Bates et al. | |
| 7,212,899 B2 | 5/2007 | Bates et al. | |
| 7,314,427 B2 | 1/2008 | Sakai et al. | |
| 7,455,619 B2 | 11/2008 | Jiang | |
| 7,503,233 B2 | 3/2009 | Shishido et al. | |
| 7,597,650 B2 | 10/2009 | Rzepecki, II et al. | |
| 7,953,538 B2 * | 5/2011 | Matsubara et al. | 701/99 |
| 2009/0192018 A1 | 7/2009 | Hoffmeister et al. | |
| 2010/0099536 A1 * | 4/2010 | Vennemann | 477/77 |

* cited by examiner

*Primary Examiner* — Edwin A Young
(74) *Attorney, Agent, or Firm* — David B. Kelley; MacMillan, Sobanski & Todd, LLC

(57) ABSTRACT

A method for controlling a power-off downshift in a power-shift transmission includes disengaging the current gear, synchronizing engine speed and a speed of the target gear layshaft by increasing a torque capacity of the target gear clutch, disengaging the clutch, engaging the target gear, and reengaging the clutch.

13 Claims, 3 Drawing Sheets

POWER-OFF DOWNSHIFT ENGAGEMENT DAMPENING

BACKGROUND OF THE INVENTION

1. Field of the Invention

This invention relates generally to a vehicle powertrain, and, in particular, to control of a power-off downshift of a powershift transmission.

2. Description of the Prior Art

A powershift transmission is a geared mechanism employing two input clutches used to produce multiple gear ratios in forward drive and reverse drive. It transmits power continuously using synchronized clutch-to-clutch shifts. A dual clutch transmission (DCT) has no torque converter The transmission incorporates gearing arranged in a dual layshaft configuration between the transmission input and its output. One input clutch transmits torque between the input and a first layshaft associated with even-numbered gears; the other input clutch transmits torque between the transmission input and a second layshaft associated with odd-numbered gears. The transmission produces gear ratio changes by alternately engaging a first input clutch and running in a current gear, disengaging the second input clutch, preparing a power path in the transmission for operation in the target gear, disengaging the first clutch, engaging the second clutch and preparing another power path in the transmission for operation in the next gear.

During a vehicle launch condition in a conventional vehicle whose powertrain includes a powershift transmission, the engine and transmission are concurrently controlled in a coordinated manner to provide acceptable vehicle launch performance. In a powershift transmission vehicle application, providing consistent and acceptable vehicle launch performance can be a rather difficult control problem due to the lack of a torque converter. During a vehicle launch condition in this type of vehicle application, the torque capacity of the transmission clutch and slip across the clutch are carefully controlled in coordination with the engine torque to provide the desired vehicle response.

During a power-off condition the coastdown 2-1 sync speed of first gear could be above engine speed. Depending on the engine braking rate, the target gear layshaft speed may decelerate quickly. If the layshaft speed were lower than engine speed, synchronizing those speeds could cause gear lash crossings along with coastdown bobble.

A need exists in the industry for a control that avoids gear lash during a power-off downshift in a powershift transmission.

SUMMARY OF THE INVENTION

A method for controlling a power-off downshift in a powershift transmission includes disengaging the current gear, synchronizing engine speed and a speed of the target gear layshaft by increasing a torque capacity of the target gear clutch, disengaging the clutch, engaging the target gear, and reengaging the clutch.

The control induces no lash crossings with engine speed and provides an opportunity to apply a very low force smoothing the synchronization.

The control improves the smoothness of a power-off downshift in which speed synchronization occurs by applying clutch torque to the target gear layshaft while the layshaft is disengaged from the driving wheels.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
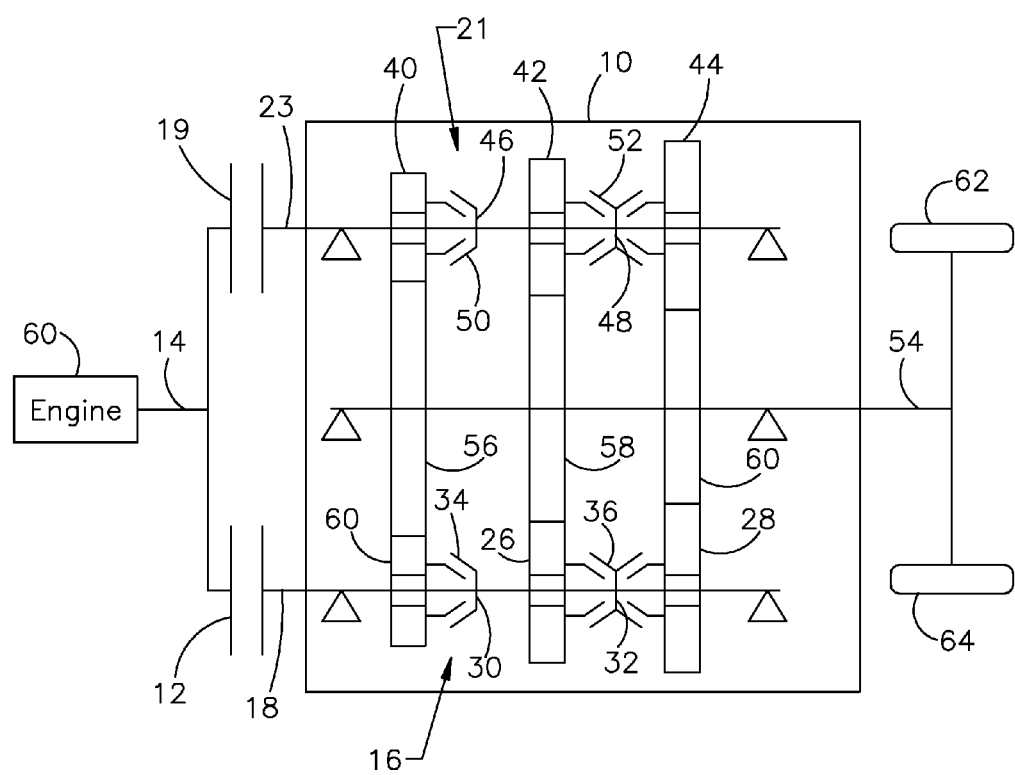
FIG. 1 is a schematic diagram showing details of a powershift transmission.

FIG. 1 illustrates details of a powershift transmission 10 including input clutch 18, which selective connects the input 14 of transmission 10 alternately to the even-numbered gears 16 associated with a first layshaft 18, and input clutch 19, which selective connects the input 20 alternately to the odd-numbered gears 21 associated with a second layshaft 23.

Layshaft 18 supports pinions 24, 26, 28, which are each journalled on shaft 18, and couplers 30, 32, which are secured to shaft 18. Pinions 24, 26, 28 are associated respectively with the second, fourth and sixth gears. Coupler 30 includes a sleeve 34, which can be moved leftward to engage pinion 24 and driveably connect pinion 24 to shaft 18. Coupler 32 includes a sleeve 36, which can be moved leftward to engage pinion 26 and driveably connect pinion 26 to shaft 18, and can be moved rightward to engage pinion 28 and driveably connect pinion 28 to shaft 18.

Layshaft 23 supports pinions 40, 42, 44, which are each journalled on shaft 23, and couplers 46, 48, which are secured to shaft 23. Pinions 40, 42, 44 are associated respectively with the first, third and fifth gears. Coupler 46 includes a sleeve 50, which can be moved leftward to engage pinion 40 and driveably connect pinion 40 to shaft 23. Coupler 48 includes a sleeve 52, which can be moved leftward to engage pinion 42 and driveably connect pinion 42 to shaft 23, and can be moved rightward to engage pinion 448 and driveably connect pinion 44 to shaft 23.

Transmission output 54 supports gears 56, 58, 60, which are each secured to shaft 54. Gear 56 meshes with pinions 24 and 40. Gear 58 meshes with pinions 26 and 42. Gear 60 meshes with pinions 28 and 44.

Couplers 30, 32, 46, 48 may be synchronizers, or dog clutches or a combination of these. A first shift drum (not shown) supported for rotation about an axis and formed with cam recesses, moves coupler sleeves 50, 52 along layshaft 23 between neutral positions, wherein none of the odd-numbered pinions 40, 42, 44 is connected to layshaft 23, and an engaged position, wherein one of the pinions 40, 42, 44 is connected to layshaft 23. Similarly, a second shift drum (not shown) supported for rotation about an axis and formed with cam recesses, moves coupler sleeves 34, 36 along layshaft 18 between neutral positions, wherein none of the even-numbered pinions 24, 26, 28 is connected to layshaft 18, and an engaged position, wherein one of the pinions 24, 26, 28 is connected to layshaft 18.

Alternatively, each clutch servo can be hydraulically actuated such that the torque capacity of each input clutch 18, 19 varies with a variable magnitude of hydraulic pressure supplied to the respective clutch.

Although operation of transmission 10 is described with reference to forward drive only, the transmission can produce reverse drive by incorporating a reverse idler gear in one of the lower gear power paths and a reverse coupler for engaging reverse drive. One of the input clutches 12, 19 would be engaged when reverse drive operation is selected.

During a power-off or coastdown condition, engine 60 produces substantially no wheel torque, the vehicle is coasting and the wheels 62, 64 transmit power to engine 60 through a final drive (not shown), transmission 10, at least on of the clutches 12, 19, and input shaft 14. During a power-on condition, engine 60 produces wheel torque and transmits power to the vehicle wheels 62, 64 through input shaft 20, at least one of the clutches 12, 19, transmission 10, and the final drive.

Figure 2:
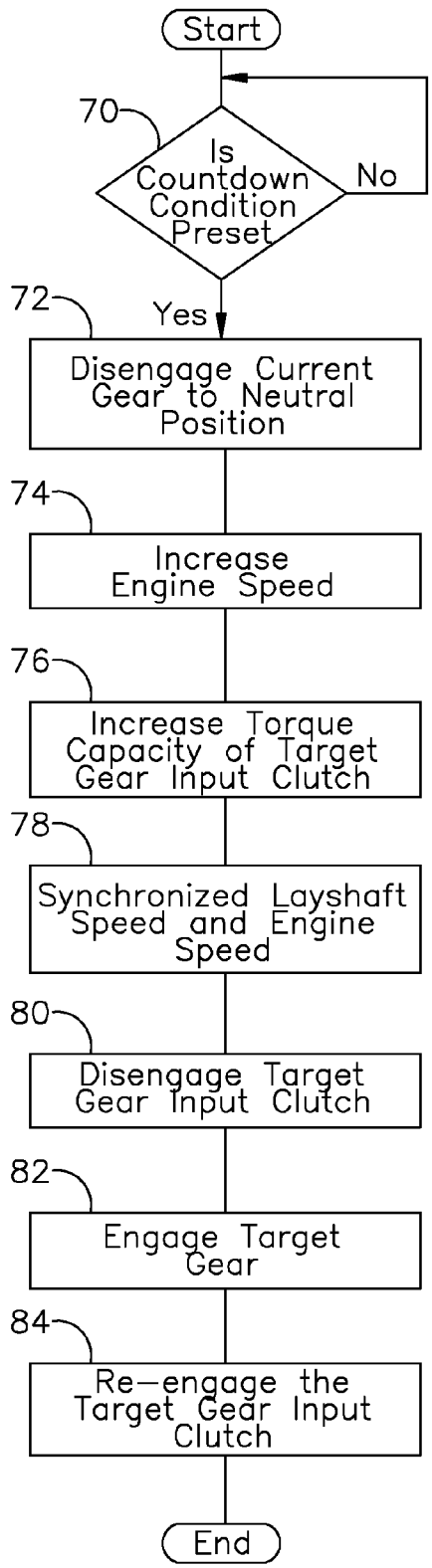
FIG. 2 is a diagram illustrating the steps of a method for controlling a power-off downshift in a powershift transmission.

A control strategy is described with reference to a downshift from third gear to first gear during a coastdown or power-off condition. The steps of an algorithm for controlling the downshift are shown in the method steps diagram of FIG. 2.

At step 70, a test is made to determine whether the vehicle is in a power-off, coastdown condition, i.e., the vehicle is decelerating and engine torque is low, less than about 10 Nm. If test 70 is logically false, step 70 is reexecuted.

If the result of test 70 is logically true, at step 72 a 3-1 downshift is initiated by disengaging the current gear, third gear, and maintaining the first shift drum in its neutral position.

At step 74, engine speed is increased to about 1500 rpm.

At step 76, the torque transmitting capacity of input clutch 19, i.e., the input clutch associated with the target gear, first gear, is increased.

At step 78, the speed of layshaft 23 is synchronized with the speed of the engine 60.

At step 80, input clutch is disengaged.

At step 82, first gear is engaged by rotating the first shift drum, causing coupler sleeve 50 to connect first speed pinion and layshaft 23, thereby connecting the driving wheels 62, 64 and layshaft 23 through the output shaft 54, gear 56 and pinion 40.

At step 84, input clutch 19 is reengaged, thereby connecting the driving wheels 62, 64 and engine 60 through output shaft 54, gear 56, pinion 40, layshaft 23, clutch 19 and input shaft 14.

Figure 3:
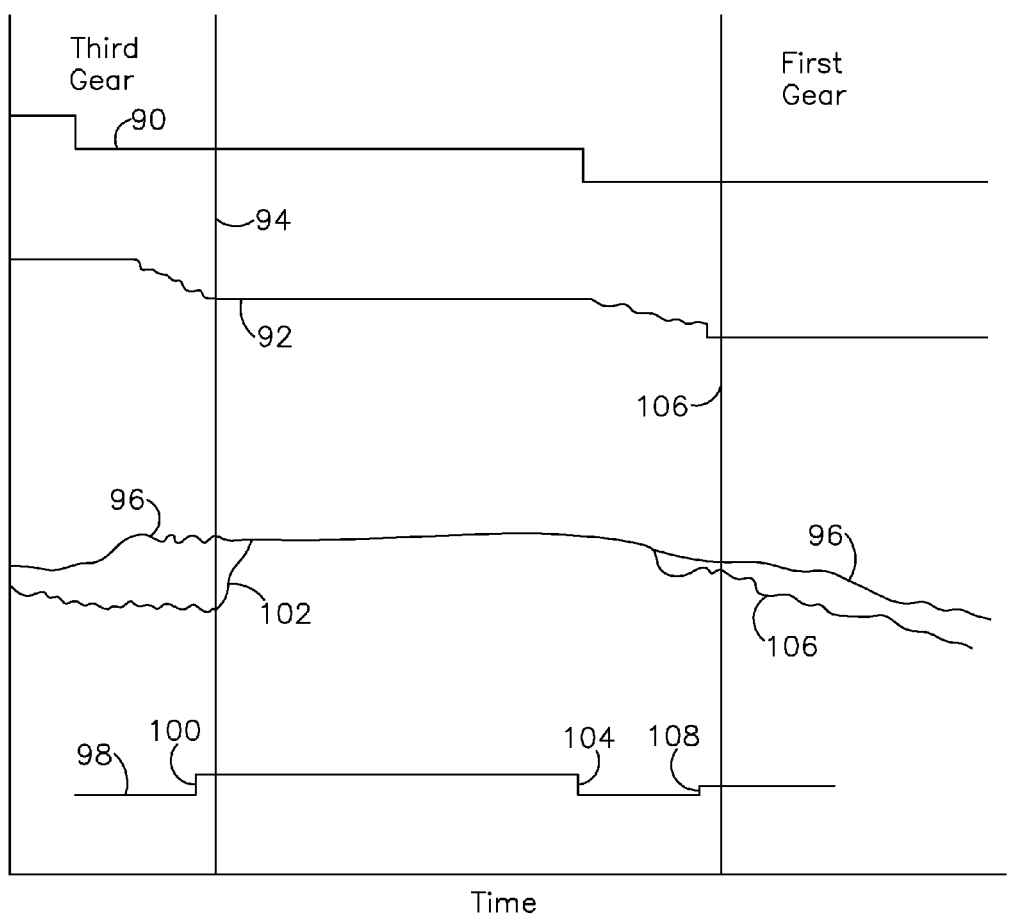
FIG. 3 is a graph that shows the variation with time of various powertrain parameters during the downshift.

FIG. 3 shows graphically the changes of various powertrain parameters during the 3-1 downshift. In FIG. 3, the transmission operates in the commanded gear 90, which is third gear, until the sleeve 52 of coupler 48 is moved by the first shift drum to the neutral position 92 upon executing step 72 at 94.

Engine speed 96 is low during the coastdown until it is increased upon executing step 74.

The torque transmitting capacity 98 of clutch 19 is increased at 100 while coupler 48 is in its neutral position, thereby synchronizing the speed 102 of layshaft 23 and engine speed at 96.

The torque capacity 98 of input clutch 19 is reduced to zero by disengaging clutch 19 when step 80 is executed at 104.

First gear is engaged at 106 when step 82 is executed.

The torque capacity 98 of input clutch 19 is increased at 108 when step 84 is executed.

In accordance with the provisions of the patent statutes, the preferred embodiment has been described. However, it should be noted that the alternate embodiments can be practiced otherwise than as specifically illustrated and described.

The invention claimed is:

1. A method for controlling a power-off downshift in a powershift transmission, comprising:
   (a) disengaging a current gear;
   (b) using a torque capacity of a target gear clutch to synchronize engine speed and a speed of a target gear layshaft;
   (c) disengaging said clutch;
   (d) engaging the target gear;
   (e) reengaging said clutch.

2. The method of claim 1, wherein step (a) further comprises:
   disengaging a coupler that connects one of a plurality of gears that produces the current gear from a layshaft on which said gear is supported.

3. The method of claim 1, wherein step (a) further comprises:
   disengaging a coupler that connects one of a plurality of gears that produces the current gear from a layshaft on which said gear is supported; and
   maintaining said coupler in a neutral position.

4. The method of claim 1, wherein step (b) further comprises increasing engine speed to a speed greater than a current speed of the target gear layshaft before synchronizing engine speed and a speed of the target gear layshaft.

5. The method of claim 1, wherein step (b) further comprises increasing a torque capacity of the target gear clutch.

6. The method of claim 1, wherein step (c) further comprises producing a stepwise reduction in torque capacity of the target gear clutch.

7. The method of claim 1, wherein step (d) further comprises:
   using a coupler to produce a drive connection between one of a plurality of gears that produces the target gear and a layshaft on which said gear is supported.

8. A method for controlling a power-off downshift in a powershift transmission, comprising:
   (a) disengaging a current gear from driven vehicle wheels;
   (b) increasing engine speed to a speed greater than a current speed of a target gear layshaft;
   (c) using a torque capacity of a target gear clutch to synchronize engine speed and a speed of a target gear layshaft;
   (d) disengaging said clutch;
   (e) engaging the target gear;
   (f) reengaging said clutch.

9. The method of claim 8, wherein step (a) further comprises:
   moving to a neutral position a sleeve of a coupler that connects one of a plurality of gears that produces the current gear.

10. The method of claim 8, wherein step (a) further comprises:
    moving to a neutral position a sleeve of a coupler that connects one of a plurality of gears that produces the current gear; and
    maintaining said coupler sleeve in the neutral position.

11. The method of claim 8, wherein step (c) further comprises increasing a torque capacity of the target gear clutch.

12. The method of claim 8, wherein step (d) further comprises producing a stepwise reduction in torque capacity of the target gear clutch.

13. The method of claim 8, wherein step (e) further comprises:
    using a coupler to produce a drive connection between one of a plurality of gears that produces the target gear and a layshaft on which said one of a plurality of gears is supported.

* * * * *